Aug. 12, 1924.  
E. TARAGNOLI  
1,504,282  
SYSTEM OF PREVENTING THE THEFT OF MOTOR VEHICLES  
Original Filed Nov. 29, 1921  
2 Sheets-Sheet 2
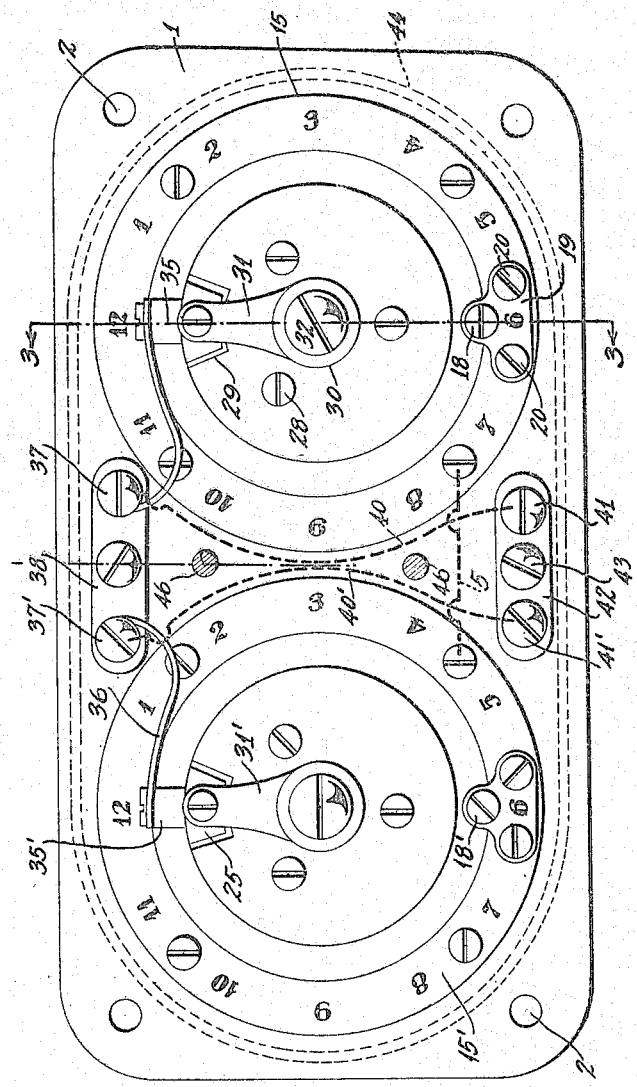
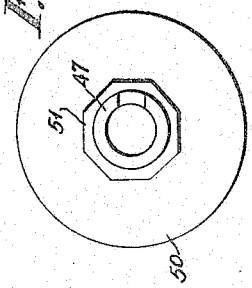
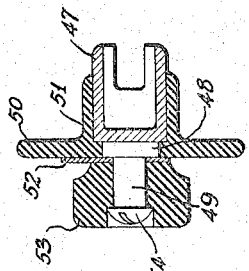
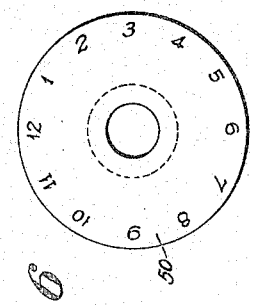
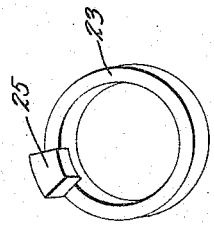
INVENTOR.  
*Elvezio Taragnoli*  
BY *Jas. H. Griffin*  
ATTORNEYS.

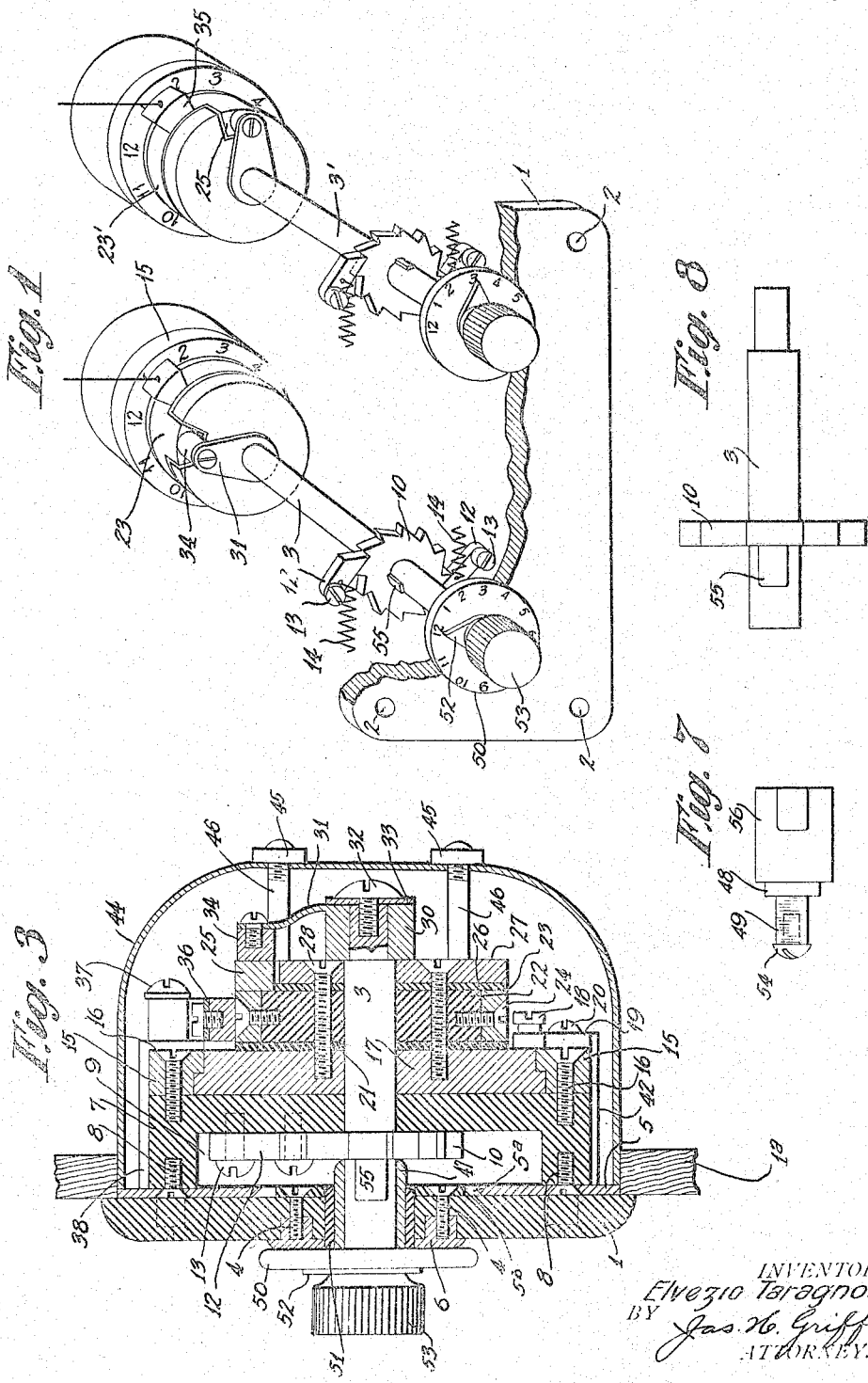

Patented Aug. 12, 1924.

1,504,282

UNITED STATES PATENT OFFICE.

ELVEZIO TARAGNOLI, OF WEST NEW YORK, NEW JERSEY, ASSIGNOR OF ONE-THIRD TO RICHARD JAUCH AND ONE-THIRD TO CHARLES BERTONI, BOTH OF WEST NEW YORK, NEW JERSEY.

SYSTEM OF PREVENTING THE THEFT OF MOTOR VEHICLES.

Original application filed November 29, 1921, Serial No. 518,554. Divided and this application filed March 26, 1923. Serial No. 627,790.

*To all whom it may concern:*

Be it known that I, ELVEZIO TARAGNOLI, a citizen of Switzerland, residing in West New York, in the county of Hudson and State of New Jersey, have invented a certain new and useful System of Preventing the Theft of Motor Vehicles, of which the following is a specification.

This application is a division of my application Serial No. 518,554 and relates, more particularly, to means for preventing the theft of motor vehicles through the control of the operativeness of the ignition circuit of the vehicle. More especially the present invention consists in a permutation switch whereby only a person familiar with the combination thereof can effect the operativeness of said circuit.

The object of the invention is to provide a permutation switch for this purpose which will be simple and efficient in the carrying out of its intended functions and which will be so constituted as to preclude its operation by unauthorized persons.

Features of the invention, other than those adverted to, will be apparent from the hereinafter detailed description and claims, when read in conjunction with the accompanying drawings.

The accompanying drawings illustrate one practical embodiment of the invention, but the construction therein shown is to be understood as illustrative, only, and not as defining the limits of the invention.

Figure 1 is a diagrammatic perspective view of a switch embodying this invention.

Figure 2 is a rear elevation of the switch.

Figure 3 is a section on the line 3—3 of Figure 2.

Figure 4 is a section through a key by means of which the permutation switches are controlled.

Figure 5 is a back view of the key.

Figure 6 is a front view thereof.

Figure 7 is a detail side elevation of one of the parts of the key.

Figure 8 is a side elevation of one of the switch shafts or spindles; and,

Figure 9 is a perspective view of an element employed in the switch construction.

In Figure 1 of the drawings, which diagrammatically shows the switch, it will be noted that a portion of the permutation switch mechanism is shown backwards, so that this diagrammatic view may graphically illustrate the operation of the invention, in a clear and concise manner. Figure 2, however, illustrates the parts of the switch mechanism correctly in rear elevation, so that the structure will be clearly understood.

The switch mechanism of this invention constitutes, in effect, two switch elements so that the circuit which it controls may be made or broken at two points. Both of these switch elements are identical in construction, so that the description of one will suffice for both.

Both switches are mounted on a front plate 1, which is of insulating material and is backed up by a metallic plate 5 of substantially the same size as the front plate 1. The front plate 1 is provided with holes 2 and the metallic plate 5 is provided with alined holes and through these holes screws $2^a$ may be passed for the purpose of simultaneously mounting both of said plates upon any suitable part of the car such as on the instrument board $1^a$. The front plate is provided with two holes through which a key, hereinafter described, is adapted to be introduced, to engage with shafts or spindles 3 or 3′, which shafts or spindles control the two permutation switches. Juxtaposed with the said holes in the front plate are larger holes $5^a$ in the metallic plate 5 and positioned in these holes $5^a$ are plates $5^b$. Screws 4 extend through these plates $5^b$ and thread into keyhole discs 6 to screw said discs to the front of the front plate.

On the back of the metallic plate 5 the two permutation switches are mounted. Each of which embodies a base 7 fixed to the plate 5 by screws 8. The forward face of each base 7, which is preferably made of metal, is recessed as at 9 and in this recess operates a ratchet 10 rigidly secured to a shaft or spindle 3 extending coaxial of the base 7 and having its forward end projecting into the keyhole of the front plate. Bolts 12 are pivotally secured on screws 13 to the base of the recess 9 and are held in engagement with the ratchet 10 by means of springs 14, so as to permit of rotation of the shaft 3 in only one direction. The ratchet 10 is preferably provided with twelve teeth for reasons hereinafter explained.

Secured to the rear face of each base 7 is a metallic ring 15 held rigidly in position by screws 16 and the inner circumference of this ring is undercut to embrace the outer circumference of a rotatable disc 17. The rear face of the ring 15 bears numbers from one to twelve (see Figure 2) corresponding to the number of teeth of the ratchet 10.

The rotatable disc 17 is adapted to be rotated within the ring 15, but may be locked in any desired position by means of clamping screw 18, which threads through a plate 19. This plate 19 is firmly secured to the ring 15 by means of screws 20, so that when the clamping screw 18 is screwed down against the rear face of the rotatable disc 17, it will clamp said disc against rotation.

In abutting relation to the rear face of the rotatable disc 17 is an insulating disc 21, back of which is positioned an insulating core disc 22, which is embraced circumferentially by a metallic contact ring 23, secured in place by screws 24 and having at one point in its circumference a rearwardly extending finger 25. The contact ring 23 with its projecting contact finger 25 is shown in perspective in Figure 9 of the drawings.

Overlying the rear faces of the contact ring 23 and the insulating core disc 22, is an insulating plate 26, against which a metallic disc 27 is drawn by screws 28 passing through the metal disc 27, the insulating plates 26 and 21 and through the core disc 22 and threading into the rotatable disc 17. These parts which are secured to the rotatable disc 17 are manifestly bodily movable therewith and the metal disc 27 and insulating plate 26 are cut away as at 29, so that the contact finger 25 may extend rearwardly through this cut away portion to a position wherein its rear end will be flush with the rear face of the disc 27. It will be noted from Figures 2 and 3 that the cut away portion 29 is sufficiently large to leave clearance between its edges and the contact finger 25, so that said contact finger will be insulated from the disc 27. The rear end of the shaft 3 is squared to receive the hub 30 of a leaf spring wiper 31. Said hub is secured in position on the squared end of the shaft by means of a screw 32, which threads into the end of the shaft and bears against a washer 33 seated on the end of the hub 30. The spring wiper 31 extends radially of the shaft 3 and carries at its outer end a movable contact brush 34, which, by virtue of the resiliency of the wiper 31, is maintained in engagement with the rear face of the metal disc 27, but is adapted to be rotated with the shaft 3 to engage with the contact finger 25 of he contact ring 23.

The detailed description of the parts just enumerated is duplicated for both switches and bearing against the outer circumference of the contact ring 23 of each switch is a brush, the brush associated with the switch of the shaft 3 being designated 35 and the brush associated with the switch of the shaft 3′ being designated 35′. These brushes are supported by springs 36 and 36′ which hold them firmly against the contact rings and said springs are mounted by screws 37 and 37′ on an insulating post 38 extending rearwardly from the front plate 1. This post is secured to the front plate by means of a screw 39. The screws 37 and 37′ are insulated from one another, but are respectively connected by wires 40 and 40′ to binding posts 41 and 41′, associated with an insulating bracket 42 extending rearwardly from the front plate 1 and secured thereto by means of a screw 43. Associated with the front plate 1 and extending rearwardly therefrom, so as to house and conceal the switch parts thus far described, is a casing 44, which may be secured in position by means of nuts 45, associated with threaded posts 46, as shown in Figures 2 and 3.

From the foregoing description, it will appear that if positive and negative wiring leads are associated with the binding posts 41 and 41′, that the rotation of the shafts 3 and 3′ to bring the spring wipers 31 and 31′ into contact with the contacts 25 and 25′ will complete the electric circuit of which the said electric leads form a part, since the wipers are electrically connected with one another through the shafts 3 and 3′ and the metallic plate 5. The circuit would be as follows:

From the binding post 41 through wire 40 to post 37, thence through spring 36 and contact 35 to contact ring 23, thence through contact finger 25 of said ring to the wiper 31 and then by way of the shaft 3 to the plate 5, the current flowing to the binding post 41′ through the corresponding parts of the other switch in reverse order.

In order that this circuit be completed, however, it is essential that both wipers 31 and 31′ are in engagement with both contact fingers 25 and 25′. If both are not so positioned, the circuit cannot be completed through the switches until the shaft of the improperly positioned wiper is manipulated to correctly position said wiper.

Manual manipulation of the shafts 3 and 3′ by the driver or owner of the car, is made possible by means of the key shown in detail in Figures 4, 5 and 6. The key embodies a metallic cup or spindle 47 provided at its closed end with a circular boss 48 from which projects a square shank 49. Revolvably mounted on the circular boss 48 is a dial 50 preferably of insulating material and provided with a hub 51, the outer configuration of which is octagonal, while the interior of the hub is circular as shown in Figure 5. Over the square shank 49 is slipped an index or pointer 52, which is followed by a knob 53 of insulating material and a screw 54 threads into the end of the shank and brings the finger 52 and knob 53 firmly against the end of the boss 48, while leaving the dial 50 and its hub 51 free to rotate on the boss 48 and cup 47.

The forward end of each of the shafts 3 and 3' is provided with a key or feather 55 positioned directly forward of the sprocket 10, as shown in Figure 8, and the cup member 47 of each key has a cut out portion 56 corresponding in shape to the key or feather 55. The front of the dial 50 is provided with a series of spaced numbers from one to twelve, which correspond to the numbers on the ring 15 of each switch and which ring may be termed the dial ring. The key shown in Figure 4 is adapted to be brought into cooperative relation with the shafts in succession or two keys may be employed, one for each shaft, if desired. In any event, the octagonal shaped hub 51 is adapted to fit into the correspondingly shaped hole in the keyhole discs 6, so as to mount the dial 50 against rotation and the cut out portion 56 is adapted to interlock with the key or feather 55 of the shaft. By this construction, the knob 53 may be rotated to rotate the shaft, while the dial 50 is maintained against rotation by the interfitting octagonal portions.

In describing the setting of the switches, we will assume that the combination will be 12 for the switch associated with the shaft 3 and 3 for the switch associated with the shaft 3'. The switches are only shown in Figure 2 as set at 12, so that it will be only necessary to set the right hand switch at 3 on the dial ring 15' to accomplish this, the binding screw 18' is loosened to permit of rotation of the rotatable disc corresponding to the disc 17, so that all the parts of the switch mounted upon this rotatable disc may be turned for the purpose of bringing the contact finger 25 into juxtaposition with the "3" on the dial ring 15'.

The clamping screw 18" is thereupon tightened for the purpose of locking the parts in position. It will appear that dial rings 15 and 15' are fixed in stationary position and do not turn during the setting of the combination. The "12" on each dial is at all times at the top of the dial, so that, if the driver in inserting the key in Figure 4 is particular to so insert the key that the dial 50 thereof will at all times be positioned with the "12" at the top, he may be sure that the dial 50 will correspond exactly in position to the dial ring 15 or 15' of the associated switch. Having set the switches in the manner described, they may be readily manipulated through the employment of a key as set forth by merely rotating the knob of such key, so as to bring the spring wiper of the associated switch into juxtaposition with the contact finger of the associated contact ring 23 or 23'. This manipulation of the wiper may be readily followed by observing the finger or pointer 52 associated with the dial 50, so that the operator in manipulating the knob, can, if he knows the combination of the switches, rapidly and readily set the switches so that a circuit in which the binding posts 41 and 41' are included, may be completed through the switches.

In practically carrying out the invention, the switches hereinbefore described in detail are included, preferably, in series, in the ignition circuit of the vehicle motor so that said ignition circuit is controlled by these switches. It is therefore necessary to the completing of this circuit that both switches be closed as neither can complete the circuit without the other. Accordingly, it is inconceivable that any unauthorized person could possibly stumble upon the combination of both switches and render the circuit operative. One must manifestly be in possession of the combination in order to start the car.

In practically carrying out the present invention, I may use either one or more permutation switches, as desired, tho two are preferable, and, moreover, while the invention has been specifically referred to as particularly adapted for use on automobiles for controlling the operativeness thereof, I wish it understood that it may be employed in other environments and is adapted for general application in the signalling art.

In the foregoing detailed description, I have set forth the invention in its preferred practical form. I am aware however that changes may be made in the construction illustrated as by the substitution of equivalents without departure from the spirit or scope of the invention, which is to be understood as broadly novel as commensurate with the appended claims.

Having thus fully described the invention, what I claim as new and desire to secure by Letters Patent is:

1. A permutation switch embodying a front plate provided with a polygonal aperture, a shaft or spindle coaxial with said aperture and projecting rearwardly of the front plate, a contact mounted on and rotatable with the spindle, a relatively fixed contact spaced from the axis of the spindle and with which the movable contact is adapted to be brought into engagement through rotation of the spindle, a knob shaped to detachably interfit with the forward end of the spindle and to be locked against rotation therewith, a dial rotatably mounted on the knob and having a polygonal shank adapted to interfit with the polygonal aperture of the front plate to lock the dial against rotation, and an indicating pointer rigid with the knob and adapted to travel over the dial when the knob is rotated, whereby an operator by following the movements of the indicating pointer can position the movable contact in engagement with the fixed contact provided that the combination of the lock is known.

2. A permutation switch comprising a body member provided with an undercut annular channel, a stepped disc associated with the channel for rotation therein, means for normally locking the stepped disc against rotation and a fixed contact rigid with said disc in combination with a shaft extending coaxially of the disc and provided with a movable contact adapted through rotation of the shaft to be engaged with and disengaged from the fixed contact, and a knob for rotating said shaft.

3. A permutation switch embodying a front plate, provided with a polygonal aperture, a base member positioned rearwardly of and secured to the front plate, a disc rotatably mounted on the base member and carrying means for normally locking the rotatable disc against rotation, a spindle extending coaxial with the aperture in the front plate and the rotatable disc, a movable contact rotatable with the spindle, a knob adapted to interfit with one end of the spindle and be locked against rotation therewith, a dial rotatably mounted on the knob and having a polygonal shank adapted to interfit with the polygonal aperture of the front plate to lock the dial against rotation, and an indicating finger rigid with the knob and adapted to travel over the dial when the knob is rotated, said indicating finger and movable contact pointing in the same direction, whereby an operator by following the movements of the indicating finger can position the movable contact in engagement with the fixed contact provided that the combination of the lock is known.

4. A permutation switch embodying a front plate, provided with a polygonal aperture, a base member positioned rearwardly of and secured to the front plate, a disc rotatably mounted on the base member and carrying means for normally locking the rotatable disc against rotation, a spindle extending coaxial with the aperture in the front plate and the rotatable disc, a movable contact rotatable with the spindle, a knob adapted to interfit with one end of the spindle and be locked against rotation therewith, a dial rotatably mounted on the knob and having a polygonal shank adapted to interfit with the polygonal aperture of the front plate to lock the dial against rotation, and an indicating finger rigid with the knob and adapted to travel over the dial when the knob is rotated, said indicating finger and movable contact pointing in the same direction, whereby an operator by following the movements of the indicating finger can position the movable contact in engagement with the fixed contact provided that the combination of the lock is known, and means for limiting the rotation of the spindle to one direction.

5. A permutation switch embodying a front plate provided with a polygonal aperture, a base member secured to the back of the front plate, a rotatable member carrying a contact ring having a projecting contact finger, said rotatable member being mounted for rotation on the base member so that the position of the contact finger may be changed to vary the combination, means for locking the rotatable member in fixed position after the combination has been set, a resilient brush engaging with the contact ring to convey current to the contact finger irrespective of its circumferential position, a spindle coaxial with the polygonal aperture of the front plate and carrying a contact adapted to be moved through rotation of the spindle into engagement with the contact finger, a chambered knob adapted to be thrust through the aperture of the front plate and rigidly engage with the spindle, a dial rotatably mounted on the knob and having a polygonal shank adapted to interfit with the polygonal aperture of the front plate to lock the dial against rotation, and a pointer rigid with the knob, cooperating with the dial, and pointing in the same direction as the movable contact, whereby the pointer may be watched during the rotation of the knob to enable the positioning of the movable contact in engagement with the contact finger by one who is familiar with the combination of the lock.

6. A permutation switch embodying a front plate provided with a polygonal aperture, a base member secured to the back of the front plate, a rotatable member carrying a contact ring having a projecting contact finger, said rotatable member being mounted for rotation on the base member, so that the position of the contact finger may be changed to vary the combination, means for locking the rotatable member in fixed position after the combination has been set, a resilient brush engaging with the contact ring to convey current to the contact finger irrespective of its circumferential position, a spindle coaxial with the polygonal aperture of the front plate and carrying a contact adapted to be moved through rotation of the spindle into engagement with the contact finger, a chambered knob adapted to be thrust through the aperture of the front plate and rigidly engage with the spindle, a dial rotatably mounted on the knob and having a polygonal shank adapted to interfit with the polygonal aperture of the front plate to lock the dial against rotation, and a pointer rigid with the knob, cooperating with the dial, and pointing in the same direction as the movable contact, whereby the pointer may be watched during the rotation of the knob to enable the positioning of the movable contact in engagement with the contact finger by one who is familiar with the combination of the lock, in combination with a ratchet wheel rigid with the spindle and a pawl mounted on a fixed pivot and cooperating with the ratchet to preclude rotation of the spindle in one direction and to control the positions of rest of the movable contact.

7. A permutation switch comprising a body member provided with an undercut annular channel, a stepped disc associated with the channel for rotation therein, means for normally locking the stepped disc against rotation and a fixed contact rigid with said disc in combination with a shaft extending coaxially of the disc and provided with a movable contact adapted through rotation of the shaft to be engaged with and disengaged from the fixed contact, a knob for rotating said shaft in one direction, a rigid wheel associated with the shaft, and a pawl cooperating with the rigid wheel to preclude the operation of the shaft in the opposite direction.

In testimony whereof, I have signed the annexed specification.

ELVEZIO TARAGNOLI.